(12) United States Patent
Chauhan et al.

(10) Patent No.: US 11,979,740 B2
(45) Date of Patent: May 7, 2024

(54) SECURE DATA TRANSMISSION ON LOW POWER NETWORK

(71) Applicant: Bank of America Corporation, Charlotte, NC (US)

(72) Inventors: Sandeep Kumar Chauhan, Miyapur Hyderabad (IN); Sheetal Bhatia, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 278 days.

(21) Appl. No.: 17/712,220

(22) Filed: Apr. 4, 2022

(65) Prior Publication Data

US 2023/0319548 A1 Oct. 5, 2023

(51) Int. Cl.
| | |
|---|---|
| *H04W 12/03* | (2021.01) |
| *H04W 4/80* | (2018.01) |
| *H04W 12/00* | (2021.01) |
| *H04W 12/041* | (2021.01) |
| *H04W 12/06* | (2021.01) |

(52) U.S. Cl.
CPC .......... *H04W 12/03* (2021.01); *H04W 4/80* (2018.02); *H04W 12/009* (2019.01); *H04W 12/041* (2021.01); *H04W 12/06* (2013.01)

(58) Field of Classification Search
CPC ..... H04W 12/03; H04W 4/80; H04W 12/009; H04W 12/041; H04W 12/06
See application file for complete search history.

(56) References Cited

U.S. PATENT DOCUMENTS

| 8,700,729 B2* | 4/2014 | Dua | G06Q 20/40 |
| | | | 705/64 |
| 10,380,581 B2* | 8/2019 | Zarakas | G06Q 20/409 |
| 2013/0200999 A1* | 8/2013 | Spodak | G16H 10/65 |
| | | | 340/5.65 |
| 2020/0074437 A1* | 3/2020 | Bonsi | G06Q 20/326 |

OTHER PUBLICATIONS

Rippen et al. Interactive Multitask Credit Card Technology, (Year: 2007).*

* cited by examiner

*Primary Examiner* — Bryan Y Lee
(74) *Attorney, Agent, or Firm* — Weiss & Arons LLP

(57) ABSTRACT

Systems, methods, and apparatus are provided for securing transmission of sensitive data on an LPWAN network such as LoRaWAN. Long-range, low-power transmission may enable a transaction card to communicate with a financial institution server without internet or cellular connectivity. The transaction card may generate a first security key. The key may include a transaction timestamp, a random number generated by the transaction card microprocessor, a personal identifier received at the transaction card from a user, one or more card parameters, and/or any suitable factors. A long-range, low-power network server may detect the card transmission. The server may retrieve the card parameters and personal identifiers stored in association with a user account during card registration. The server may generate a second security key. Based on a match between the first security key and the second security key, the server may authenticate the transmission.

18 Claims, 5 Drawing Sheets

SECURE DATA TRANSMISSION ON LOW POWER NETWORK

FIELD OF TECHNOLOGY

Aspects of the disclosure relate to transmission of sensitive data over low-power networks.

BACKGROUND OF THE DISCLOSURE

Low Power Wide Area Networks (LPWANs) are a specialized category of wireless networks designed to maximize coverage and reduce power consumption for devices. LPWANs may use unlicensed or licensed radio frequencies for transmission.

One example of an LPWAN is Lora WAN which works with LoRa™ technology. LoRa™ (short for "long range") is a proprietary LPWAN modulation technique. LoRa™ is owned by Semtech Corporation and uses modulation derived from chirp spread spectrum technology to convert data for radio wave transmission.

LoRa™ is an LPWAN protocol that defines the physical layer of the network. LoRaWAN is an upper layer protocol that defines the network communication and architecture. LoRaWAN software is open source, and servers and gateways are widely available and interoperable. LoRaWAN has extended range and enables transmissions without internet or cellular connectivity.

While low-power networks provide a number of advantages, transmission of sensitive data over a low power network may leave the data vulnerable to attack by bad actors. It would be desirable to provide security measures to protect data during transfers via an LPWAN.

SUMMARY OF THE DISCLOSURE

Systems, methods, and apparatus for securing transmission of sensitive transaction card data over an LPWAN are provided.

A long-range, LPWAN transaction card may receive a personal identifier from a user. The LPWAN transaction card may include a microprocessor that generates a first transmission security key. The first transmission security key may include the personal identifier, a transaction card parameter, a randomly generated number, and/or a transmission timestamp.

The LPWAN transaction card may encrypt the security key and transmit the encrypted key in a message header. The message header may include metadata such as a bank identifier.

A sensor associated with an LPWAN server may detect the transmission and, based on the header metadata, decrypt the security key. The server may retrieve a user identifier and transaction card parameter that were stored in association with a user account during card registration. The server may generate a second security key that includes the retrieved identifier and card parameters, a randomly generated number, and the transmission timestamp. The server may authenticate the message based on a match between the first security key and the second security key.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
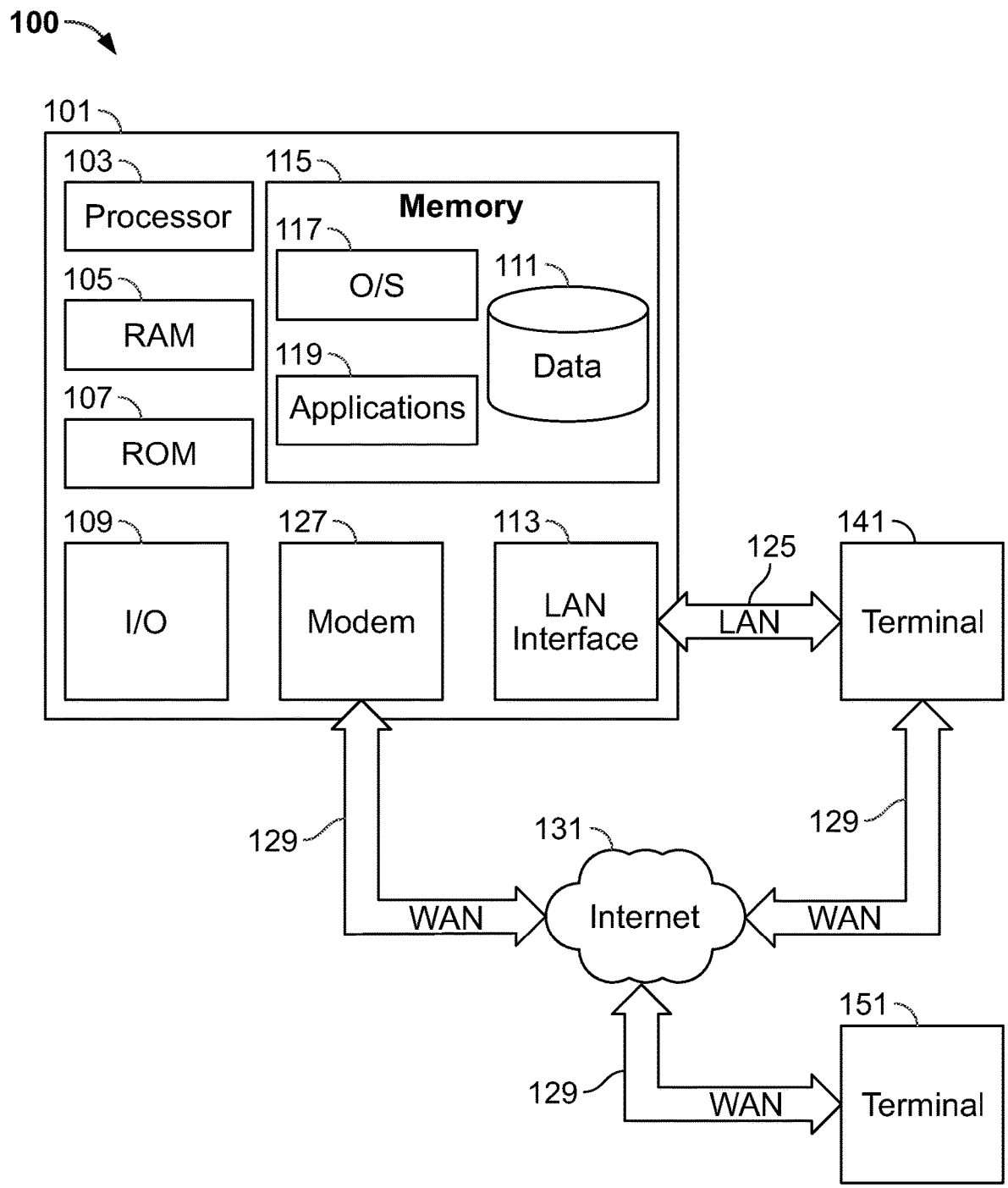
FIG. 1 shows illustrative apparatus in accordance with principles of the disclosure.

Systems, methods, and apparatus for secure data transmission on a low-power network.

For the sake of illustration, the invention will be described as being performed by a "system." The system may include one or more features of apparatus and methods that are described herein and/or any other suitable device or approach.

The system may include a low-power network transaction card. The transaction card may be a payment (e.g., debit or credit) card that includes embedded integrated circuitry. The integrated circuitry may be configured to store sensitive transaction information. The integrated circuitry may also be configured to execute machine readable instructions that control operation of other components of the transaction card.

The transaction card may include a microprocessor and a Network Interface Card ("NIC"). The microprocessor and associated NIC may enable the transaction card to establish a communication channel. Over the secure communication channel, the low-power network transaction card may interact directly with a secure system. The secure system may be operated by an issuer of the transaction card. The microprocessor may have a thickness that is not greater than 0.25 millimeters ("mm"). The microprocessor may control overall operation of the transaction card and its associated components.

The transaction card may include various other hardware components. Such components may include a battery, a speaker, a fingerprint reader, and antenna(s). The transaction card may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. Software may provide instructions, that when executed by the microprocessor, enable the transaction card to perform various functions. For example, software may include an operating system, application programs, web browser and a database. Alternatively, some or all of computer executable instructions of the transaction card may be embodied in hardware or firmware components of the transaction card.

Application programs, which may be used by the transaction card, may include computer-executable instructions for invoking user functionality related to communication, authentication services, and voice input and speech recognition applications. Application programs may utilize one or more algorithms that encrypt information, process received executable instructions, interact with an issuer bank systems, perform power management routines or other suitable tasks.

The transaction card may include a pressure sensitive button. The pressure sensitive button may have a thickness that is not greater than 0.8 mm. A user may actuate the pressure sensitive button to power on or off one or more components of the transaction card. For example, actuating the pressure sensitive button may activate the microprocessor or NIC. Activating the pressure sensitive button may activate a touch-sensitive screen, or keypad of the transaction card.

The transaction card may operate in a networked environment. The transaction card may support establishing communication channels with one or more financial institution systems. The transaction card may connect to a long-range, low-power wide area network (LPWAN) such as LoRaWAN. The transaction card may connect to the network through a network interface or adapter. The NIC may include the network interface or adapter. The network interface may be a LoRa™ chip.

The transaction card may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The transaction card may utilize computer-executable instructions, such as program modules, being executed by a computer. Generally, program modules include routines, programs, objects, components, data structures, etc. that perform particular tasks or implement particular abstract data types. The transaction card may be operational with distributed computing environments where tasks are performed by remote processing devices that are linked through a communications network. In a distributed computing environment, program modules may be located in both local and remote computer storage media including memory storage devices.

The transaction card may include one or more batteries. A battery of the transaction card may be flexible. The battery may be a power source for electronic hardware components of the transaction card. For example, the battery may supply power to a keypad, touch-sensitive screen, NIC and microprocessor. The battery may have a thickness that is not greater than 0.5 mm.

The battery may be rechargeable. The battery may be recharged via any suitable method. Illustrative charging methods include solar charging, wireless inductive charging, and connection via a charging port.

In some embodiments, the transaction card may include an electrical contact. The battery may be recharged via an electrical contact when the transaction card is inserted into an Automated Teller Machine ("ATM"). An electrical contact may be constructed using any suitable material that conducts or transfers electricity. The transaction card may include a plurality of electrical contacts. An electrical contact may be accessible on any suitable face of a housing of the transaction card. The contact may be utilized to transfer electrical charge to the rechargeable battery when the transaction card is inserted into a card reader of the ATM.

In some embodiments, the transaction card's power source may include high frequency signals received from an ATM or other network node. The transaction card may be configured to utilize received high frequency signals to recharge the battery or provide power to other hardware components of the transaction card. The high frequency signals may conform to a standardized near field communication (NFC) communication standard.

Illustrative NFC protocols include European Computer Manufacturers Association Document Nos. 340 and 352 and International Organization for Standardization Document Nos. 18092 and 21481. All these standards are hereby incorporated by reference herein in their entireties.

The transaction card may include a housing. The housing may provide a protective layer for internal components of the transaction card. The housing may be flexible. The housing may be constructed from plastic or other suitable materials. The housing may define a form factor of the transaction card. The microprocessor and other components of the transaction card may be embedded in and protected by the housing. In some embodiments, the transaction card may include a touch-sensitive screen on an outside surface of the housing. The transaction card may include a keypad mounted on an outside surface of the housing.

The housing and the keypad collectively may have a thickness that is not greater than 0.8 millimeters ("mm") and a surface area that is not greater than 86 mm×54 mm. Such a compact form factor may allow the transaction card to be inserted into traditional card readers and function as a typical debit or credit card.

For example, the user may use the transaction card to access an ATM and withdraw cash. The user may also use the transaction card to make a purchase at a traditional brick and mortar merchant location. The user may pay for such a purchase using a conventional point-of-sale ("POS") terminal at the brick-and-mortar location. When the transaction card is inserted into card reader of an ATM or POS terminal a battery of the transaction card may be recharged.

The system may enable communication with a financial institution when in range of a financial institution long-range, low-power network server. The network may be a LoRaWAN network.

The transaction card may include a sensor micro-device for communication via an LPWAN network. The LPWAN transaction card may connect to the network without internet, Bluetooth™, or cellular connectivity. The micro-device may be a LoRa™ chipset for long-range, low-power communication. Alternatively, the transaction card may include any suitable communication hardware.

The transaction card may include a distributed model for authentication. The microprocessor embedded in the card may generate a unique security key. The security key may be based on a combination of any suitable parameters.

Parameters may include a random number generated by the microprocessor. Parameters may include a timestamp associated with the time of a card transaction or with the time of transmission.

Parameters may include a personal identifier provided by the user. The personal identifier may be a fingerprint, voiceprint, PIN, or any suitable identifier. A user fingerprint may be received at a fingerprint reader on the surface of the transaction card. A user voiceprint or PIN may be received at an audio receiver embedded in the transaction card. In some embodiments, a PIN may be entered directly into the card using a keypad or touch-sensitive screen on the surface of the card.

Parameters may include card details. Illustrative card details may include sensitive transaction information stored on the transaction card. Sensitive transaction information, as used herein, may include:

Primary Account Number ("PAN")
User name
Address
Telephone number
Expiration date
Service code
Authentication data
Personal Identification Number ("PIN")
PIN Block
Card validation value (CVV), or any other three/four-digit card security code The PAN is a typically multi-digit number printed on a front face of the transaction card. The PAN may identify an issuer bank associated with the transaction card. The PAN may identify a user account at the issuer bank.

A PIN associated with the transaction card may be a secret numeric password known only to the user of the transaction card. The PIN may be used to authenticate the user before providing access to a secure payment processing system. A user may only be granted access to the secure system if the PIN provided matches a PIN stored on the secure system. For example, a PIN may be used to authenticate the transaction card at an ATM. A PIN may also be used to authorize a digital signature implemented by an EMV chip.

A PIN Block includes data used to encapsulate a PIN during processing and transmission of the PIN. The PIN block defines the location of the PIN within the PIN block and how it can be extracted from the PIN block. A typical PIN block includes the PIN, the PIN length, and may contain a subset of the PAN.

A service code may be a multidigit number. For example, in a three-digit service code, the first digit may indicate specific interchange rules that apply to the transaction card. The second digit may specify authorization processing that is applied to the transaction card when initiating a transaction. Illustrative authorization processing may include requiring submission of a PIN, biometric feature, signature or a combination thereof. The second digit may also identify a secure payment gateway that is authorized to process payment instructions formulated by the transaction card.

The third digit may specify a range of services that are authorized in connection with use of the transaction card. For example, the third digit may indicate whether the transaction card may be used at an ATM to withdraw cash or only to purchase goods or services from a merchant.

The microprocessor may combine the random number, timestamp, card details, and user identifier to generate a unique security key that is based on both the individual transmission and on the individual user. In some embodiments, one or more card parameters may be tokenized for rapid combination with the user identifier and the timestamp.

The security key may be encrypted. The system may use RSA or any suitable cryptosystem for the encryption. The security key may be broadcast in an encrypted data packet. The security key may be broadcast in an encrypted header. The data packet may include transaction data. Transaction data may be generated at the transaction card, at a POS device, at a banking center device or at any suitable location.

Listener devices within the financial institution network may detect the data packet and identify the content based on the header. Portions of the header may include pointers that enable the listener device to determine which parameters are encoded. Portions of the header may include pointers that enable the listener device to determine the type of message included. For example, the header may include appended digits that function as a bank identifier. The appended metadata may be user specific. The appended metadata may be based on a user account number or transaction card number. For example, the appended digits may be compliments of the last two digits of the card number.

The financial institution server may recreate the security key using a parallel random number generator, as well as stored card parameters and user parameters.

The financial institution server may verify the received security key against the recreated key. Based on the verification, the system may identify the user and retrieve any requested information from the financial institution servers. In some embodiments, verification may be based on a percentage match that meets or exceeds a predetermined threshold.

A user may register a transaction card in advance of a transmission. The user may request the card from the financial institution. A backend team associated with the financial institution may allocate and test the card. The user may register the card at a POS, a banking center, or at any suitable location. For example, the user may swipe the card through a card reader. The user may register a personal identifier such as a fingerprint or voiceprint. Financial institution servers may store the card identifier and user identifier in association with a user account.

In some embodiments, the user may register the transaction card using an application on a mobile device. The mobile application may be associated with the issuer financial institution. The mobile application may scan the transaction card to capture transaction card information. The mobile application may connect to the transaction card using NFC communication to capture the transaction card information. The mobile application may be configured to accept a personal identifier from the user. The mobile application may communicate the registration information to financial institution servers.

In some instances, a user may be required to synchronize a registered transaction card with financial institution servers. For example, a transaction card may stop recognizing a user identifier following a battery replacement. The user may receive a notification regarding a transaction card that is not synchronizing properly. The user may authenticate themselves to a mobile application associated with the financial institution. The mobile application may use NFC or any suitable method to connect to the transaction card. The mobile application may capture device information and transmit the transaction card information to the financial institution server. A synchronization module at the server may verify and reset transaction card parameters. The mobile application may capture the new parameters and update the transaction card.

In some embodiments, the security key generated by the transaction card may be used to encrypt the transaction card transmission. The encryption may be hash-based encryption and the security key may be used as a hash key. The financial institution servers may recreate the hash key and use it to decrypt the message.

One or more non-transitory computer-readable media storing computer-executable instructions are provided. When executed by a processor on a computer system, the instructions perform a method for securing transmission of sensitive transaction card data over a long-range, low-power network.

The method may include, at a low-power network transaction card, receiving a personal identifier from a user. The method may include generating a transmission security key that includes the personal identifier, a transaction card parameter, a randomly generated number and/or a transmission timestamp. The method may include transmitting the encrypted security key in a transmission header.

The method may include, at a low-power network server, detecting the transmission and using header metadata to identify the message for processing. The method may include retrieving stored data associated with a customer account and recreating the security key. The method may include verifying the received security key against the recreated key. The method may include authenticating the transmission based on a match between the two keys.

Following authentication of the transmission, the server may process transaction data included in the transmission. For example, the transmission may relate to authorization of a purchase at a POS or execution of a banking center transaction, such as a transfer of funds.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative apparatus 100 that may be configured in accordance with the principles of the invention. FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch-sensitive screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of generating a security key, encrypting and/or decrypting a security key, transmitting data on long-range, low-power network, detecting transmission on a long-range, low-power network, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
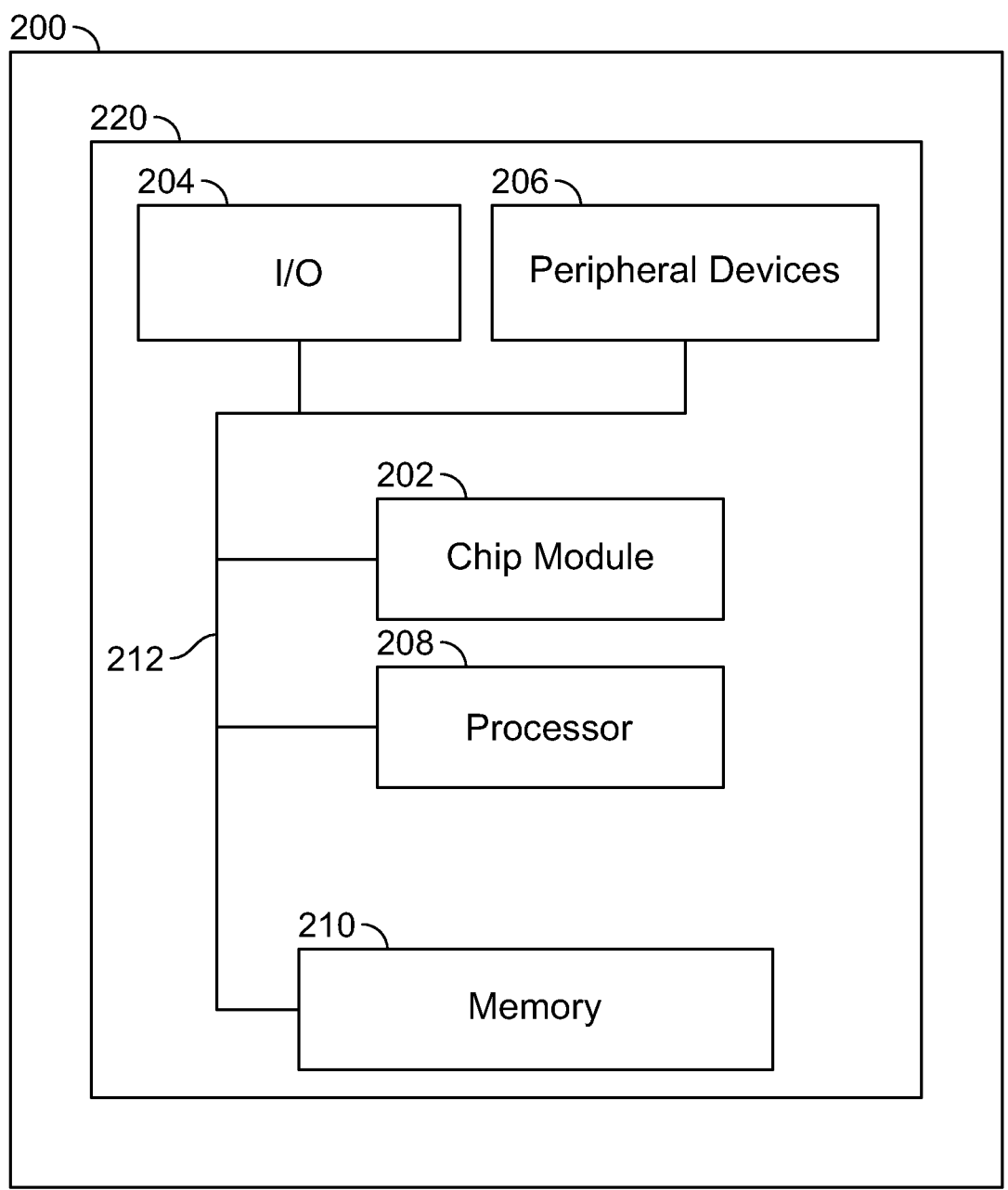
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may generate a security key, encrypt and/or decrypt a security key, detect a transmission on a long-range, low-power network, authenticate a transmission, and perform other methods described herein; and machine-readable memory 210.

Machine-readable memory 210 may be configured to store in machine-readable data structures: transaction card registration data, personal identifiers, transaction card synchronization data, security key data, authentication data, and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
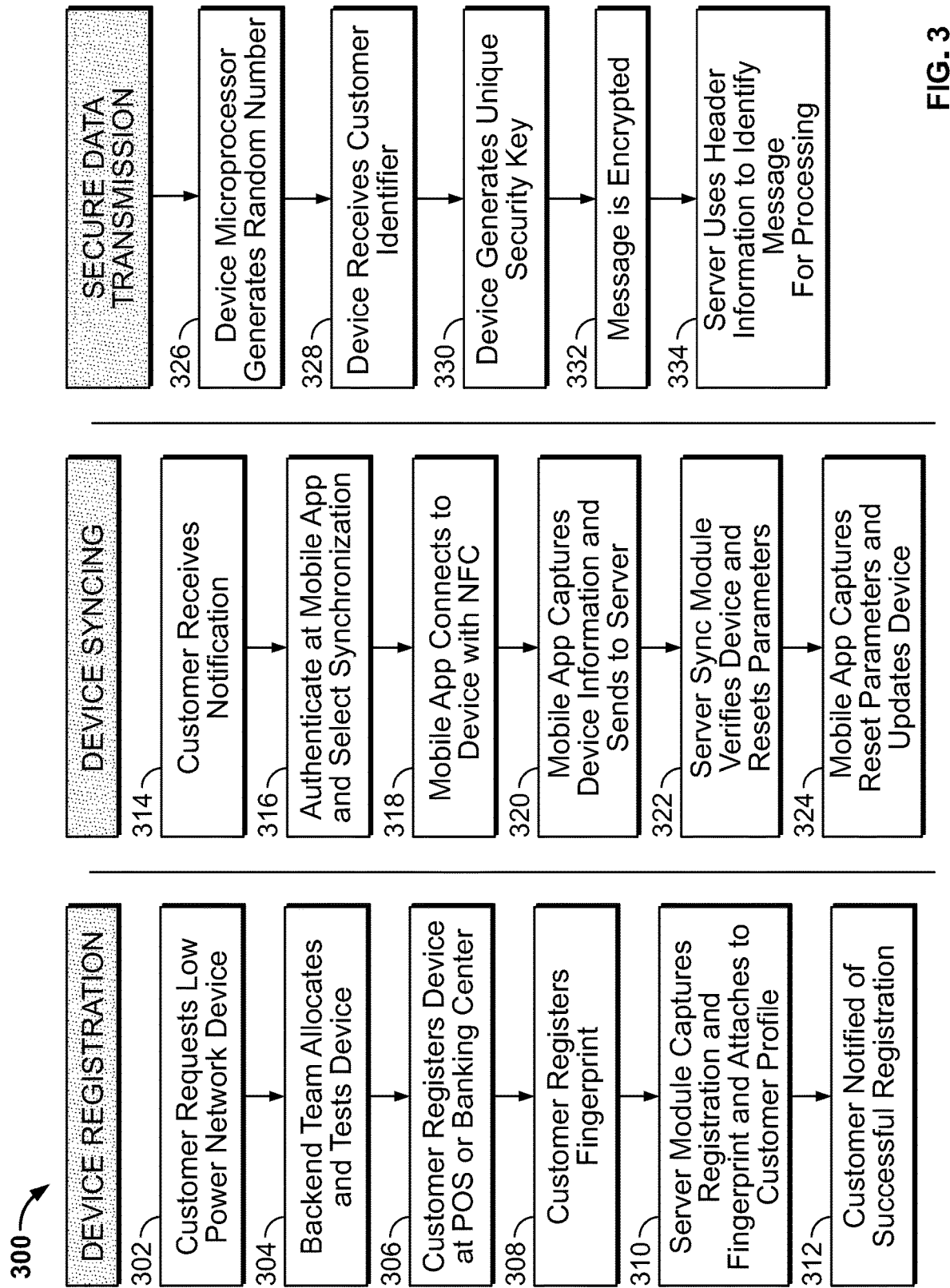
FIG. 3 shows a set of illustrative process flows in accordance with principles of the disclosure.

FIG. 3 shows system overview 300. System overview 300 shows process flows for registering a low-power network transaction card, synchronizing the transaction card with a financial institution server, and securing transmission of sensitive transaction card data on a low-power network.

Steps 302-312 show registering a low-power network transaction card. At step 302 a customer requests a low-power network device. The device may be a transaction card. At step 304, a backend team allocates and tests the device. At step 306, the customer registers the device at a POS, a banking center, or at any suitable location. At step 308, the customer registers a personal identifier such as a fingerprint. At step 312, a module on the financial institution server captures the registration and fingerprint and stores them in association with customer account information. At step 312, the customer is notified of successful registration. The notification may be though a mobile application, SMS message, electronic communication, paper-based communication, and/or any suitable communication method.

Steps 314-324 show synchronizing a low-power network transaction card with a long-range, low-power network server. At step 314, a customer receives a notification that the transaction card is not synchronized with the server data. At step 316, the customer authenticates themselves to a mobile application associated with the financial institution. The mobile application may include a selectable option for synchronizing the low-power network transaction card. At step 318, the mobile application connects to the transaction card using NFC or any suitable method. At step 320, the mobile application captures transaction card parameters and transmits the captured parameters to a server associated with the issuing financial institution. At step 322, a synchronization module at the server verifies the transaction card and resets the transaction card parameters. At step 324, the mobile application receives the new parameters and updates the transaction card via NFC.

Steps 326-334 show secure data transmission using the low-power network transaction card. At step 326, a microprocessor embedded in the transaction card generates a random number. At step 328, the transaction card receives a customer identifier such as a fingerprint. At step 330, the transaction card generates a unique security key using the random number and the fingerprint. The security key may also include transaction card parameters and a timestamp for the transaction. At step 334, a financial institution server detects the transmission and identifies it using metadata encoded in the header. The server may decrypt and process the message.

Figure 4:
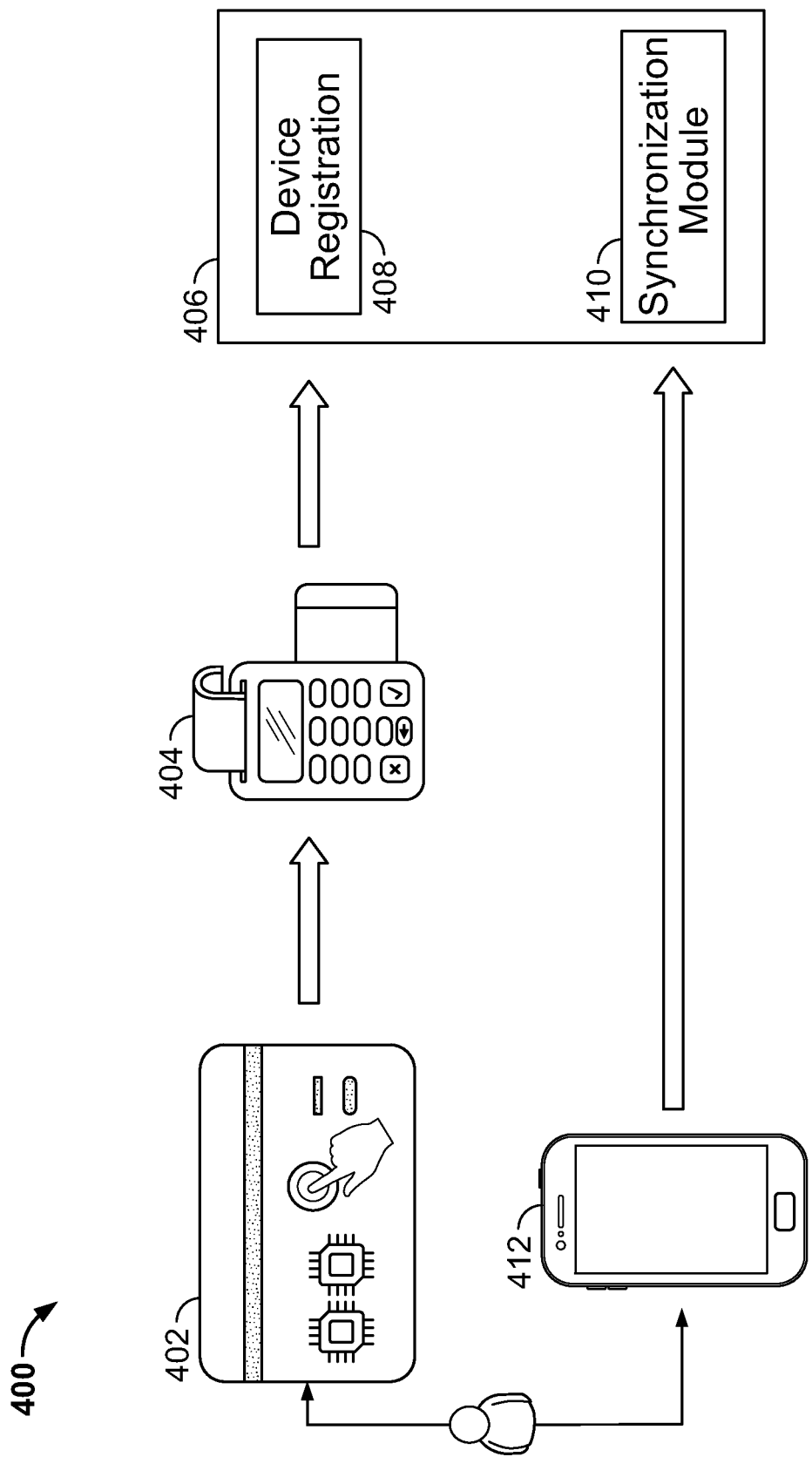
FIG. 4 shows an illustrative process flow in accordance with principles of the disclosure.

FIG. 4 shows illustrative process flow 400. Process flow 400 shows registering and synchronizing a low-power network transaction card. One or more elements of process flow 400 may overlap with elements of system overview 300, shown in FIG. 3.

Low-power network transaction card 402 may receive a user identifier such as a fingerprint. The transaction card may be registered by swiping it through banking center device 404. Device 404 may transmit the transaction card parameters and customer identifier to financial institution server 406. Server 406 may include registration module 408. Registration module 408 may store the customer identifier and transaction card parameters in association with a user account.

At some point during the life of the transaction card, it may need to be synchronized with the financial institution server. Mobile device 412 may include a financial institution application. Mobile device 412 may communicate with transaction card 402 and financial institution server 406. Server 406 may include synchronization module 410. Synchronization module 410 may reset transaction card parameters. Synchronization module 410 may update the transaction card parameters that were stored in association with the user account during registration.

Figure 5:
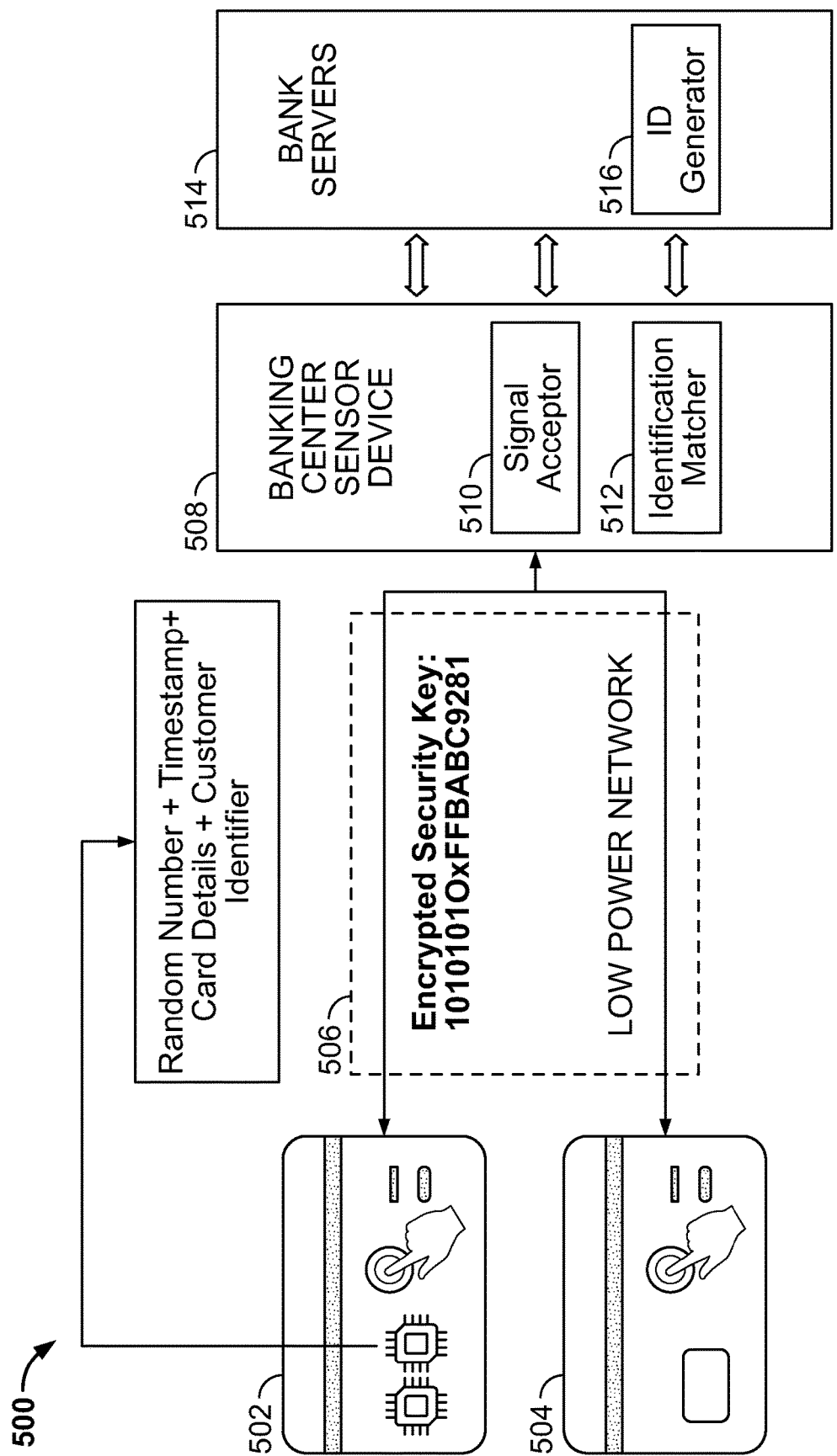
FIG. 5 shows an illustrative process flow in accordance with principles of the disclosure.

FIG. 5 shows process flow 500. Process flow 500 shows securing transmission via a low-power network. One or more elements of process flow 500 may overlap with elements of system overview 300, shown in FIG. 3.

Low-power network transaction card 502 may be associated with an issuing financial institution. A microprocessor embedded in transaction card 502 may generate a unique security key for a transmission. The security key may include a randomly generated number, a transaction timestamp, one or more transaction card parameters and/or a user identifier. Transaction card 502 is configured to receive a fingerprint identifier from a user.

Low-power network 506 may transmit the illustrative encrypted security key shown. Banking center sensor 508 may be part of low-power network 506. Sensor 508 may detect the transmission from transaction card 502. Signal acceptor 510 may process the transmission. Identification matcher 512 may determine that the signal originates from a transaction card associated with the financial institution. Metadata in the transmission header may include a bank identifier or other transmission identifiers.

Financial institution servers 514 may include ID generator 516. ID generator 516 may generate a security key from data stored in association with the user account during registration. If the security key generated by ID generator 516 matches the security key received from transaction card 502, the transmission may be authenticated.

Transaction card 504 may be associated with a different financial institution. Sensor 508 may detect the transmission from transaction card 504. However, the transmission from transaction card 504 will not include the header identifier present in the transmission from transaction card 502. Identification matcher 512 will determine not to capture the message originating from transaction card 504 for processing.

Thus, methods and apparatus for SECURE DATA TRANSMISSION ON A LOW POWER NETWORK are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for securing transmission of sensitive transaction card data over a low-power wide area network (LPWAN), the method comprising:
    a low-power network transaction card:
        receiving a personal identifier from a user;
        generating a first transmission security key comprising the personal identifier, a transaction card parameter, and a transmission timestamp; and
        encrypting the security key and transmitting the encrypted security key in a transmission header; and
    a low-power network server:
        detecting the transmission;
        decrypting the transmission header and using one or more pointers in the header to identify and retrieve a personal identifier and transaction card parameter stored in association with a user account;
        generating a second transmission security key comprising the retrieved personal identifier and transaction card parameter in combination with the transmission timestamp; and
        authenticating the transmission based on a match between the first transmission security key and the second transmission security key;
    wherein the low-power transaction card connects to an LPWAN at long-range, absent internet or cellular connectivity.

2. The method of claim 1, wherein:
    the low-power network transaction card further comprises a random number generator;
    the first security key comprises a random number generated at the low-power network transaction card; and
    the second security key comprises a random number generated at the low-power network server.

3. The method of claim 2, wherein the low-power network transaction card and the low-power network server use time-based logic to generate the random number.

4. The method of claim 1, further comprising the low-power network server:
    registering the personal identifier;
    registering the transaction card parameter; and
    storing the personal identifier and transaction card parameter in association with a user account.

5. The method of claim 1, further comprising synchronizing the transaction card parameter with a parameter stored on the low-power network server, the synchronization comprising, at a mobile application associated with the financial institution:
    receiving a selection of a synchronization option;
    capturing transaction card data and transmitting the transaction card data to the low-power network server;
    receiving a reset transaction card parameter; and
    transmitting the reset transaction card parameter to the to the transaction card.

6. The method of claim 5, further comprising, at the mobile application, connecting to the low-power network transaction card using near field communication.

7. The method of claim 1, wherein the low-power network transaction card is an internet of things device.

8. The method of claim 1, the low-power network transaction card having a thickness not greater than 0.8 millimeters ("mm") and a surface area not greater than 86 mm×54 mm.

9. The method of claim 1, wherein the pointer in the encrypted header is a bank identifier.

10. The method of claim 1, wherein the pointer in the encrypted header is derived from a customer account number.

11. A system for securing transmission of sensitive transaction card data over a low-power wide area network (LPWAN), the system comprising:
    a low-power network transaction card configured to:
        receive a personal identifier from a user;
        generate a first transmission security key comprising the personal identifier, a card parameter, and a transaction timestamp; and
        encrypt the security key and transmit the encrypted security key in a transmission header; and
    a low-power long-range network server configured to:
        detect the transmission;
        decrypt the transmission header and, based on one or more pointers in the header, identify and retrieve a personal identifier and card parameter stored in association with a user account;
        generate a second transmission security key comprising the retrieved personal identifier and card parameter and the transmission timestamp; and
        authenticate the transmission based on a match between the first transmission security key and the second transmission security key;
    wherein the low-power transaction card connects to an LPWAN at long-range, absent internet or cellular connectivity.

12. The system of claim 11, wherein:
    the low-power network card further comprises a random number generator;
    the first security key comprises a random number generated at the transaction card; and
    the second security key comprises a random number generated at the low-power network server.

13. The system of claim 11, wherein the low-power network transaction card is pre-registered with the low-power network server, the registration comprising:
    registering the personal identifier with the financial institution;
    registering the card parameter with the financial institution; and
    storing the personal identifier and card parameter on the low-power network server in association with a user account.

14. The system of claim 11, wherein the card parameter is synchronized with a parameter stored on a financial institution server, the synchronization comprising, at a mobile application:
- receiving selection of a synchronization option from a user;
- capturing transaction card data and transmitting the transaction card data to the low-power network server;
- receiving a reset card parameter from the server; and
- transmitting the reset card parameter to the transaction card.

15. The system of claim 14, wherein the mobile application connects to the low-power network transaction card using near field communication.

16. The system of claim 11, the low-power network transaction card comprising a fingerprint reader and the personal identifier comprising a fingerprint.

17. The system of claim 11, the low-power network transaction card comprising an audio receiver and the personal identifier comprising a voiceprint.

18. The system of claim 11, the low-power network transaction card having a thickness not greater than 0.8 millimeters ("mm") and a surface area not greater than 86 mm×54 mm.

\* \* \* \* \*